(12) United States Patent
Chen et al.

(10) Patent No.: US 9,043,147 B2
(45) Date of Patent: May 26, 2015

(54) NAVIGATION SYSTEM WITH FUZZY ROUTING MECHANISM AND METHOD OF OPERATION THEREOF

(71) Applicant: Telenav, Inc., Sunnyvale, CA (US)

(72) Inventors: Yuan Chen, Beijing (CN); Gao Song, Beijing (CN)

(73) Assignee: TELENAV, INC., Sunnyvale, CA (US)

( * ) Notice: Subject to any disclaimer, the term of this patent is extended or adjusted under 35 U.S.C. 154(b) by 0 days.

(21) Appl. No.: 13/861,277

(22) Filed: Apr. 11, 2013

(65) Prior Publication Data

US 2014/0309932 A1    Oct. 16, 2014

(51) Int. Cl.
G01C 21/34 (2006.01)

(52) U.S. Cl.
CPC ........ *G01C 21/3476* (2013.01); *G01C 21/3461* (2013.01)

(58) Field of Classification Search
CPC .. G01B 12/006; G01C 21/34; G01C 21/3476; G01C 21/3461

USPC .......... 701/527, 532, 533, 537, 426; 707/723, 707/769, 999.107, E17.018
See application file for complete search history.

(56) References Cited

U.S. PATENT DOCUMENTS

| | | | |
|---|---|---|---|
| 6,615,131 | B1 | 9/2003 | Rennard et al. |
| 7,437,240 | B2 | 10/2008 | Oumi et al. |
| 7,912,632 | B2 | 3/2011 | Ohashi et al. |
| 2006/0080034 | A1* | 4/2006 | Hayashi ................. 701/211 |
| 2008/0288545 | A1* | 11/2008 | Hegedus et al. ........... 707/104.1 |
| 2010/0305842 | A1 | 12/2010 | Feng |
| 2010/0332132 | A1 | 12/2010 | Okude et al. |
| 2011/0040750 | A1* | 2/2011 | Safra et al. ................. 707/723 |

* cited by examiner

*Primary Examiner* — Marthe Marc-Coleman
(74) *Attorney, Agent, or Firm* — IP Investment Law Group

(57) ABSTRACT

A method of operation of a navigation system includes: receiving an origin and a destination; receiving a route keyword for routing between the origin and the destination; identifying a via point matching the route keyword; calculating a keyword group locale based on the via point within a group distance threshold from a keyword group center; and calculating a travel route from the origin to the destination traversing the keyword group locale for displaying on a device.

20 Claims, 9 Drawing Sheets

NAVIGATION SYSTEM WITH FUZZY ROUTING MECHANISM AND METHOD OF OPERATION THEREOF

TECHNICAL FIELD

The present invention relates generally to a navigation system and more particularly to a system for navigation system with a fuzzy routing mechanism.

BACKGROUND ART

Modern portable consumer and industrial electronics, especially client devices such as navigation systems, smart phones, portable digital assistants, and combination devices are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a vehicle or on a mobile device such as a cell phone, portable navigation device (PND) or a personal digital assistant (PDA).

Often, the routing algorithm of navigation devices subjects the user to cumbersome directions in light of simpler choices. In unfamiliar areas, the user has no choice but to endure the longer travel time and the added inconvenience without even knowing of other choices.

Thus, a need still remains for a navigation system to provide information with improvement in usability, performance, and accuracy. In view of the importance of positioning systems in modern life, it is increasingly critical that answers be found to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: receiving an origin and a destination; receiving a route keyword for routing between the origin and the destination; identifying a via point matching the route keyword; calculating a keyword group locale based on the via point within a group distance threshold from a keyword group center; and calculating a travel route from the origin to the destination traversing the keyword group locale for displaying on a device.

The present invention provides a navigation system, including: a get endpoints module for receiving an origin and a destination; a receive route keywords module, coupled to the get endpoints module, for receiving a route keyword for routing between the origin and the destination; a get via points module, coupled to the receive route keywords module, for identifying a via point matching the route keyword; a calculate keyword group locales module, coupled to the get via points module, for calculating a keyword group locale based on the via point within a group distance threshold from a keyword group center; and a get route module, coupled to the calculate keyword group locales module, for calculating a travel route from the origin to the destination traversing the keyword group locale for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
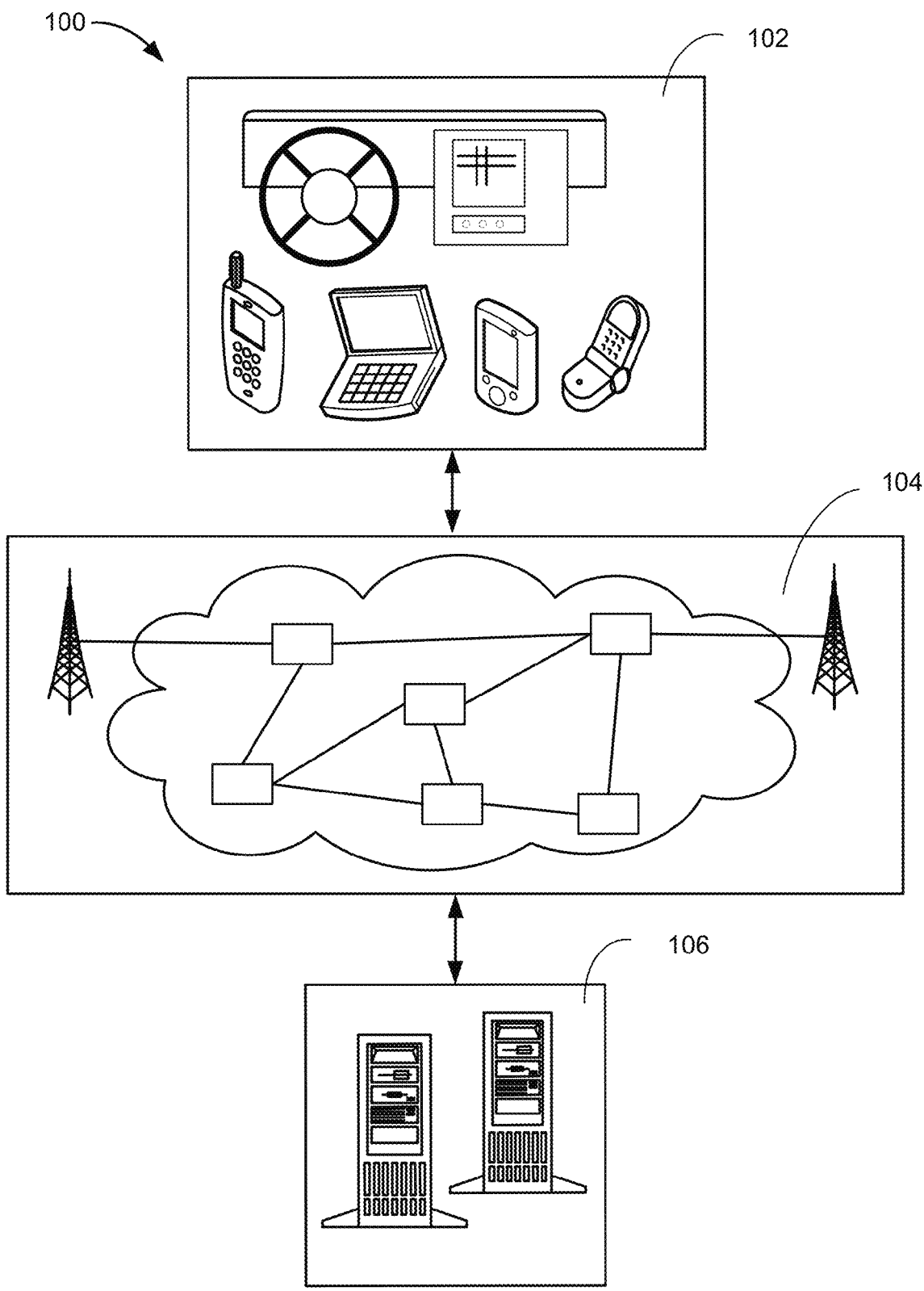
FIG. 1 is a navigation system with fuzzy routing mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGS. Similarly, although the views in the drawings for ease of description generally show similar orientations, this depiction in the FIGS. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), optical components, passive devices, or a combination thereof. The term "module" represents hardware implementation as described or used later in this document, especially when used in apparatus or system claims.

Referring now to FIG. 1, therein is shown a navigation system 100 with fuzzy routing mechanism in an embodiment of the present invention. The navigation system 100 includes a first device 102, such as a client or a server, connected to a second device 106, such as a client or server, with a communication path 104, such as a wireless or wired network. The fuzzy routing mechanism is a mechanism for routing to groups of locations rather than to individual locations.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
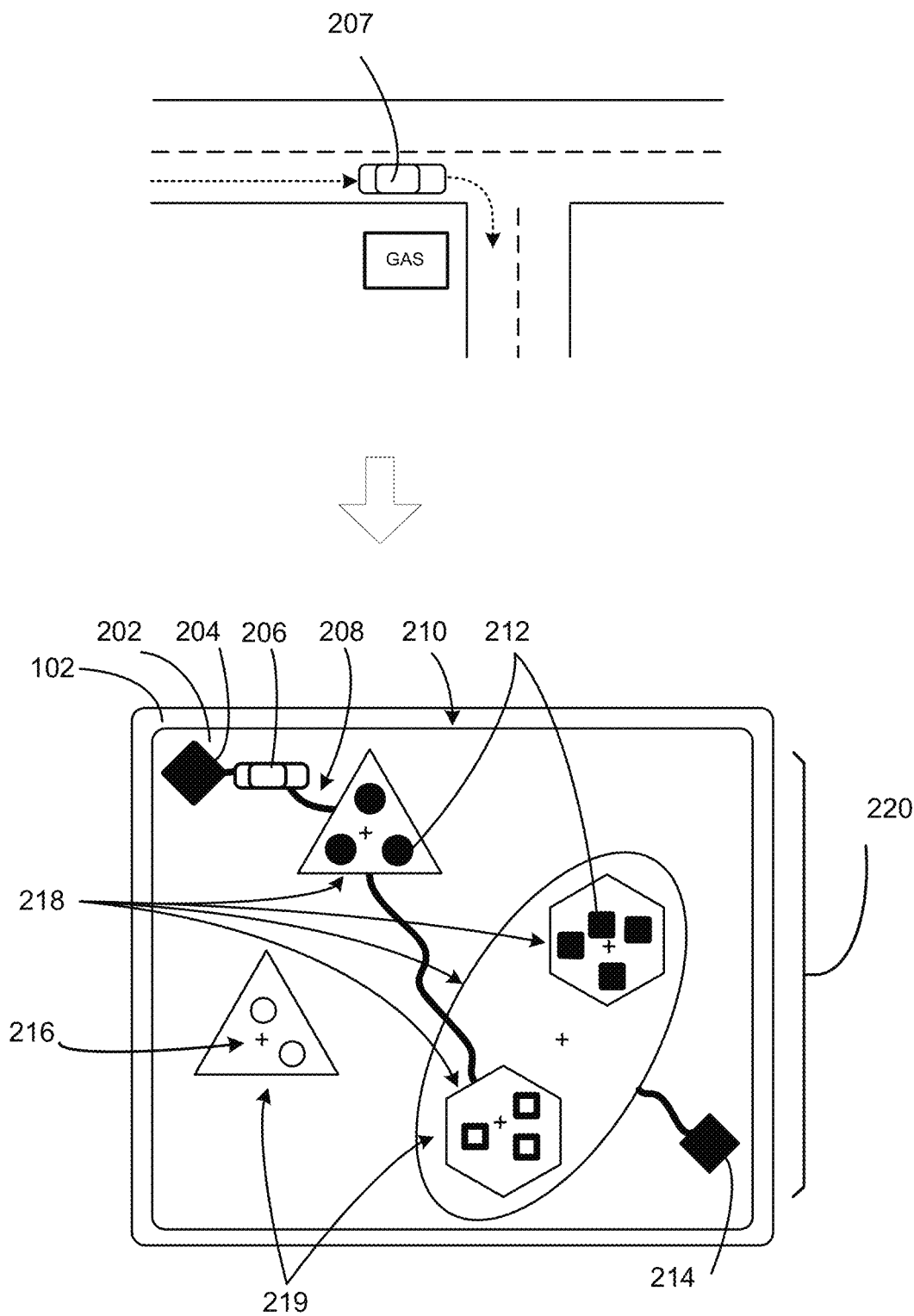
FIG. 2 is a first example of a first display interface of the first device.

Referring now to FIG. 2, therein is shown a first example of a first display interface 202 of the first device 102. The navigation system 100 of FIG. 1 can display a travel route 220 on a map 210 to guide a vehicle 207 from an origin 204 to a destination 214.

The navigation system 100 can display the travel route 220 including the origin 204 and the destination 214, overlaid on the map 210. The travel route 220 is a path for traversing from the origin 204 to the destination 214. The map 210 is defined as a representation of a geographical area. The origin 204 is a location where a vehicle can start travelling. The destination 214 is the location where a vehicle is designated to finish travelling.

The navigation system 100 can display a current location 206. The current location 206 is defined as a physical location of the first device 102. The current location 206 can be displayed on the map 210 if the first device 102 is located in a geographic area represented by the map 210. The origin 204 can be assigned to the current location 206 at the beginning of the routing process.

The navigation system 100 can display via points 212 on the map 210. The via points 212 are defined as representations of individual locations of points of interest. The via points 212 can include point of interest locations such as businesses, residences, or landmarks. Each of the via points 212 are associated with one of the keyword group locales 218.

The navigation system 100 can display the travel route 220 traversing keyword group locales 218. The keyword group locales 218 are defined as areas representing groups of the via points 212 having a common property. For example, the keyword group locales 218 can include the locations for groups of gas stations, restaurants, or supermarkets. Routing to one of the keyword group locales 218 can include routing to one of the via points 212 included in one of the keyword group locales 218.

The navigation system 100 can display keyword groups 219. The keyword groups 219 are defined as the set of the via points 212 having a common property. The keyword groups 219 are associated with the keyword group locales 218.

Each of the keyword group locales 218 can include a keyword group center 216. The keyword group center 216 is defined as a location defining the geometric center of one of the keyword group locales 218.

The keyword group center 216 can be determined in a variety of ways. For example, the keyword group center 216 can be assigned to the location of one of the via points 212. The keyword group center 216 can be assigned to be the geometric center of the via points 212 associated with one of the keyword group locales 218. The keyword group center 216 can be assigned to be a weighted centroid of the via points 212 of one of the keyword group locales 218. The keyword group center 216 can be assigned to be a location determined statistically based on the distribution of the via points 212.

The travel route 220 can include route segments 208 between the origin 204 and one of the keyword group locales 218, between keyword group locales 218, and between one of keyword group locales 218 and the destination 214. The route segments 208 are defined as the path between two locations. For example, the route segments 208 can represent the path from the origin 204 to one of the keyword group locales 218, the path between the keyword group locales 218, or the path from one of the keyword group locales 218 to the destination 214.

Figure 3:
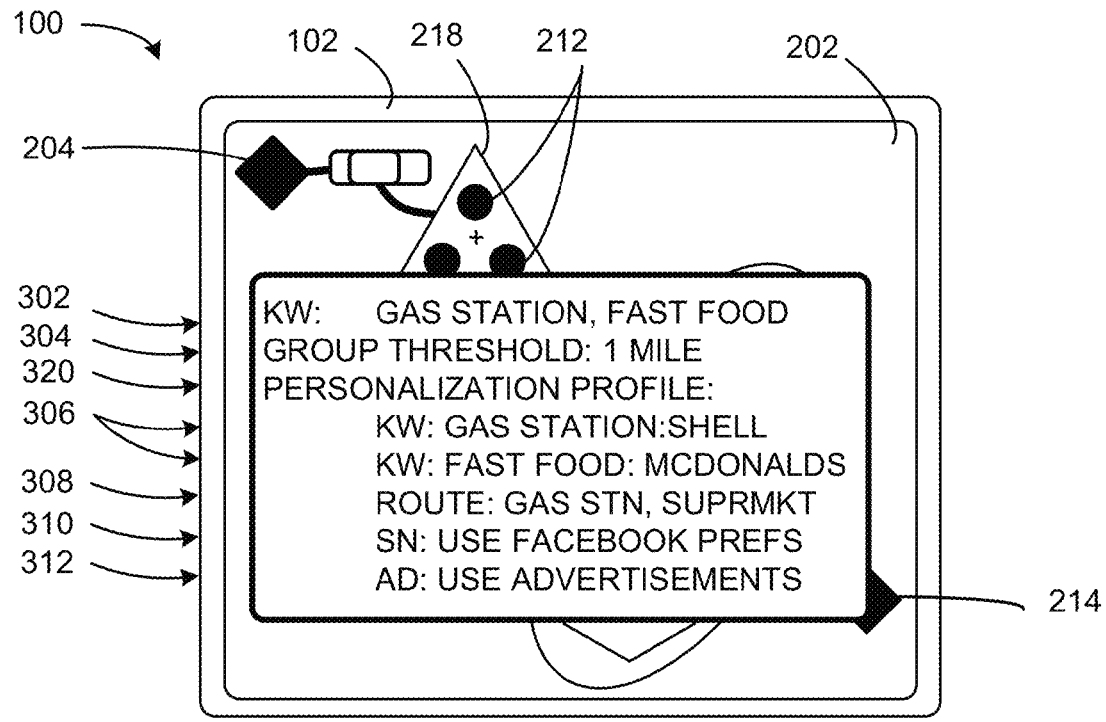
FIG. 3 is a second example of the first display interface of the first device.

Referring now to FIG. 3, therein is shown a second example of the first display interface 202 of the first device 102. The navigation system 100 can display a route keywords 302, a group distance threshold 304, and a personalization profile 320.

The route keywords 302 are defined as identifiers representing desired destinations along the travel route 220 of FIG. 2. For example, the route keywords 302 can include the entries "gas station" and "fast food" indicating that the travel route 220 from the origin 204 to the destination 214 can include the location of a gas station and the location of a fast food restaurant. Each of the route keywords 302 can be represented by one or more of the keyword group locales 218.

The keyword group locales 218 can include the via points 212 for the individual locations that match the route keywords 302. For example, one of the route keywords 302 for "gas station" can represent one of the keyword group locales 218 having the via points 212 that indicate the locations of gas stations, such as a Shell™ gas station. In another example, one of the via points 212 can indicate the location of a Safeway™ supermarket for the route keywords 302 for "supermarket".

The via points 212 can be clustered into the keyword group locales 218 based on the group distance threshold 304. The group distance threshold 304 is defined as the maximum distance between the keyword group center 216 of FIG. 2 and the via points 212 of one of the keyword group locales 218. The keyword group center 216 is the geometric center of the location of the via points 212 for one of the keyword group locales 218.

The group distance threshold 304 is used to calculate which of the via points 212 are assigned to one of the keyword group locales 218. For example, if the group distance threshold 304 is one mile, then all of the via points 212 in one of the keyword group locales 218 are within one mile of the keyword group center 216.

The keyword group locales 218 for one of the route keywords 302 can be further divided based on proximity. One of the route keywords 302 can include multiple instances of the keyword group locales 218 with each of the keyword group locales 218 having a portion of the via points 212 associated with one of the route keywords 302. For example, the via points 212 associated with one of the route keywords 302 for "supermarket" can be divided up into two of the keyword group locales 218 where each of the keyword group locales 218 represents a different group of supermarkets in a different location.

The group distance threshold 304 can be implemented in a variety of ways. For example, the group distance threshold 304 can be a single global value for each of the keyword group locales 218. Alternatively, the group distance threshold 304 can be applied individually to each one of the keyword group locales 218 and provide a different instance of the group distance threshold 304 for each of the keyword group locales 218.

The personalization profile 320 can include information about preferences that can be used to modify the route keywords 302 and routing operations. The personalization profile 320 can include keyword preferences 306, routing preferences 308, social network preferences 310, and advertising preferences 312.

The keyword preferences 306 are defined as information that can be used to modify the route keywords 302. The keyword preferences 306 can be indicate specific preferences for types of locations to be used with the route keywords 302.

For example, the keyword preferences 306 can include a preference for "Shell™" gas stations that can be used to replace the one of the route keywords 302 from "gas station" to "Shell™ gas station". In another example, the keyword preferences 306 can include a preference for "McDonalds™" restaurants by supplementing one of the route keywords 302 for "fast food" with "fast food and McDonalds™".

The routing preferences 308 are defined as information used to modify the calculation of the travel route 308. The routing preference 308 can include information for changing the order of intermediate routing stages, preferred locations for the route keywords 302, or a combination thereof.

For example, the routing preferences 308 can include the preference to traverse "gas stations" before visiting a "supermarket". In another example, the routing preferences 308 can include the preference to visit a "supermarket" near a home location, instead of near a work location.

The social network preferences 310 are defined as information to modify the route keywords 302 based on information retrieved from social networks. The social network preferences 310 can be retrieved from the driver's social networks, such as Facebook™, LinkedIn™ or Twitter™.

For example, the social network preferences 310 can include preferences acquired from Facebook™ indicating the driver "likes" Starbucks™ coffee. The personalization profile 320 can be used to modify the route keywords 302 for "coffee" to include "Starbucks™ Coffee". The social network preferences 310 can be retrieved using an application programming interface (API), a database query, text extraction, or a combination thereof.

The advertising preferences 312 are defined as information to modify the route keywords based on advertisements. The advertising preferences 312 can include preferences where the driver has opted in to receiving certain advertisements, such as advertisements for locations with discount coupons. For example, the personalization profile 320 can be used to modify the route keywords 302 for "fast food" to only include McDonalds™ locations offering a discount.

Figure 4:
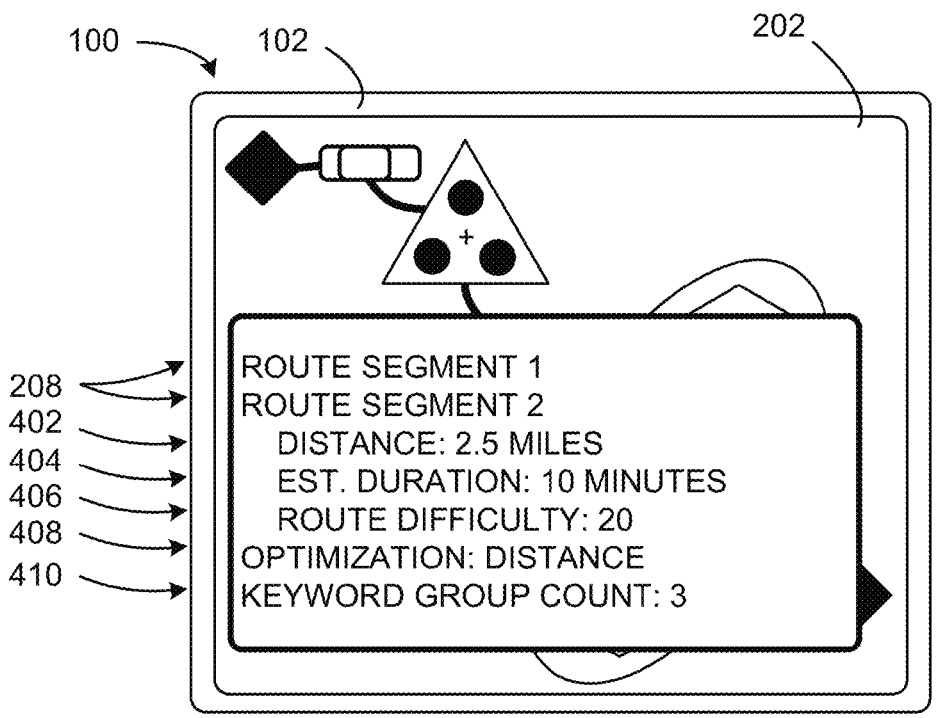
FIG. 4 is a third example of the first display interface of the first device.

Referring now to FIG. 4, therein is shown a third example of the first display interface 202 of the first device 102. The navigation system 100 can display the route segments 208, a route segment distance 402, a route segment duration 404, a route segment difficulty 406, an optimization criterion 408, and a keyword group count 410.

The route segment distance 402 is defined as the length of one of the route segments 208. The route segment distance 402 can include the physical distance along the path, a straight line distance between locations, a weighted distance based on road conditions, or a combination thereof. For example, the route segment distance 402 can be two miles.

The route segment duration 404 is defined as the estimated amount of time required to traverse one of the route segments 208. For example, the route segment duration 404 can be ten minutes.

The route segment difficulty 406 is defined as a routing weighing factor indicating the complexity of the route segments 208. For example, one of the route segments 208 with many sharp turns on a mountain road can have the route segment difficulty 406 assigned to ninety. In another example, one of the route segments 208 having mostly freeway driving with few turns can have the route segment difficulty 406 assigned to fifty.

The optimization criterion 408 is defined as a metric to determine the relative cost of a route selection. The optimization criterion 408 can include optimization by travel route length, travel route duration, travel route difficulty, or a combination thereof. For example, if the optimization criterion 408 is based on the route length, then the travel route 220 of FIG. 2 can be calculated to include the route segments 208 with the lowest total distance. In another example, if the optimization criterion 408 is based on route duration, then the travel route 220 can be calculated to include the route segments 208 with the lowest total duration.

The keyword group count 410 is defined as the maximum number of the via points 212 of FIG. 2 for one of the keyword group locales 218 of FIG. 2. The keyword group count 410 can be used to determine if one of the keyword group locales 218 should be divided.

Figure 5:
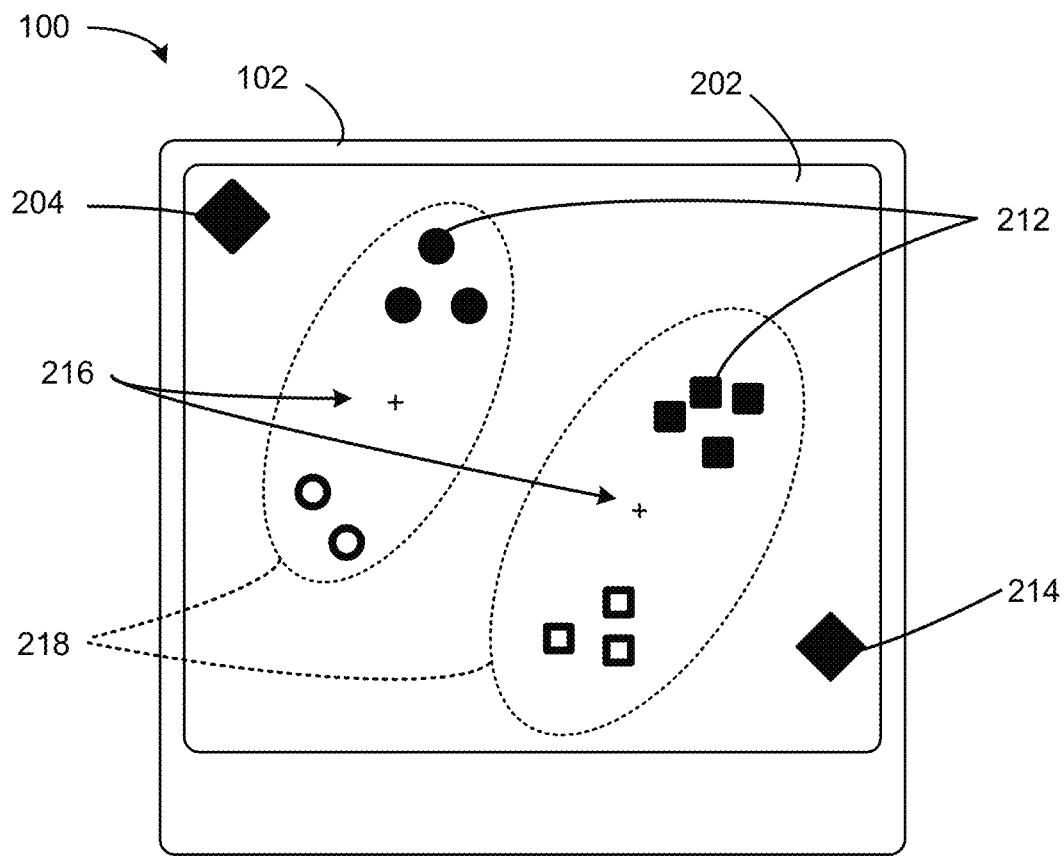
FIG. 5 is an exemplary diagram of a first routing stage.

Referring now to FIG. 5, therein is shown an exemplary diagram of a first routing stage. The first routing stage can calculate the keyword group locales 218 for the via points 212 based on the route keywords 302 of FIG. 3. For example, the first display interface 202 of the first device 102 can show two of the keyword group locales 218 having the via points 212 for two of the route keywords 302 of FIG. 3.

The navigation system 100 can include calculating the travel route 220 of FIG. 2 using a routing process having multiple stages. For example, the first routing stage can identify the via points 212 and the keyword group locales 218 for the route keywords 302. The second stage can cluster the via points 212 into the keyword group locales 218 based on the proximity of the via points 212.

The third routing stage can calculate the route segments 208 of FIG. 2 between the origin 204 and each of the keyword group locales 218 associated with one of the route keywords 302. The fourth routing stage can calculate the route segments 208 between the keyword group locales 218 associated with one of the route keywords 302 with the keyword group locales 218 of another of the route keywords 302. The fifth routing stage can calculate one of the route segments 208 between one of the keyword group locales 218 and the destination 214.

The navigation system 100 can receive the origin 204, the destination 214, and the route keywords 302 of FIG. 3. The navigation system 100 can use the route keywords 302 for identifying the via points 212 associated with each of the route keywords 302 and cluster the via points 212 to form the keyword group locales 218. Each of the keyword group locales 218 can include the via points 212 associated with one of the route keywords 302. Each of the keyword group locales 218 can include the keyword group center 216.

For example, the via points 212 of the one of the route keywords 302 for "gas stations" can be designated by circles and clustered together into one of the keyword group locales 218. In another example, the via points 212 of one of the route keywords 302 for "supermarket" can be designed by squares and clustered together into another of the keyword group locales 218.

Figure 6:
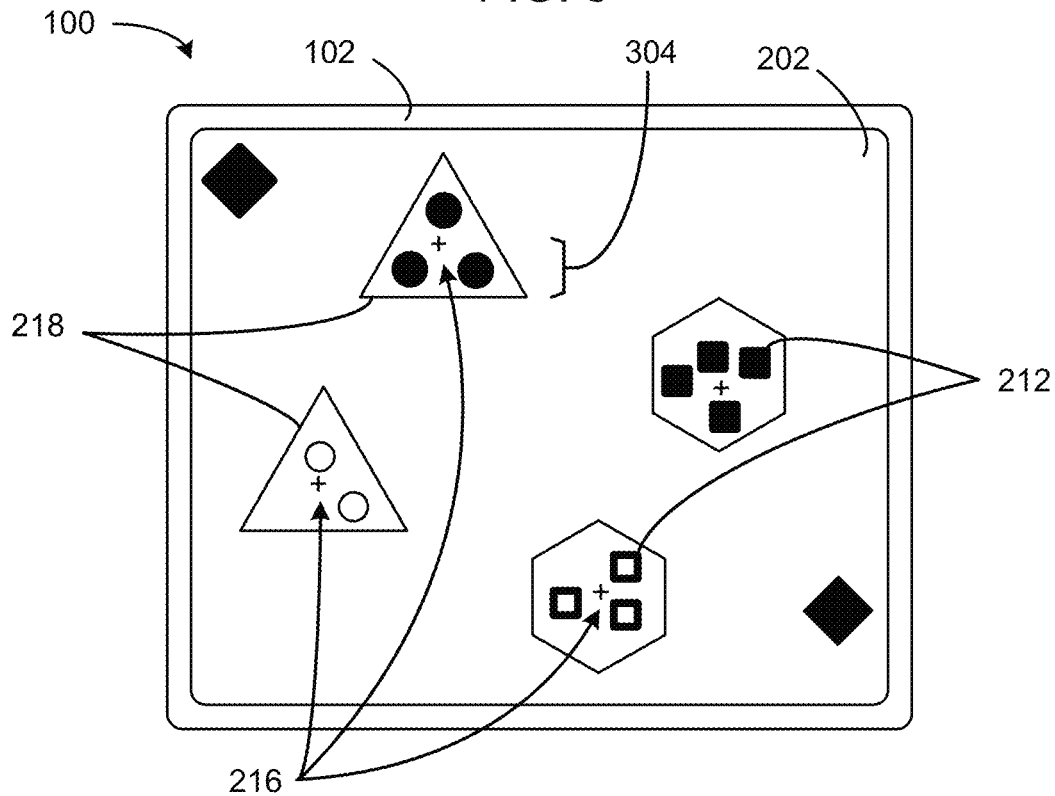
FIG. 6 is an exemplary diagram of a second routing stage.

Referring now to FIG. 6, therein is shown an exemplary diagram of a second routing stage. The first display interface 202 of the first device 102 can show the via points 212 clustered into the keyword group locales 218 based on the route keywords 302 of FIG. 2 and the proximity of the via points 212 to the keyword group center 216.

The navigation system 100 can display the via points 212 on the first display interface 202 The via points 212 of one of the route keywords 302 can be further partitioned into the keyword group locales 218 based on the location of the via points 212 being within the group distance threshold 304 of the keyword group center 216. Each of the route keywords 302 can have one or more of the keyword group locales 218 that encompass all of the via points 212 associated with one of the route keywords 302.

For example, the via points 212, as indicated by the circles in FIG. 6, associated with the route keywords 302 for "gas stations" can be clustered into two of the keyword group locales 218, as indicated by the triangular lines around the two groups of circles. Each of the keyword group locales 218 includes the via points 212 having a location within the group distance threshold 304 of the keyword group center 216 and associated with the route keywords 302 for "gas station".

In another example, the via points 212, as indicated by the squares in FIG. 6, associated with the route keywords 302 for "supermarket" can be clustered into two of the keyword group locales 218, as indicated by the hexagonal lines around the two groups of squares. Each of the keyword group locales 218 includes the via points 212 located within the group distance threshold 304 from the keyword group center 216 and associated with the route keywords for "supermarket".

Figure 7:
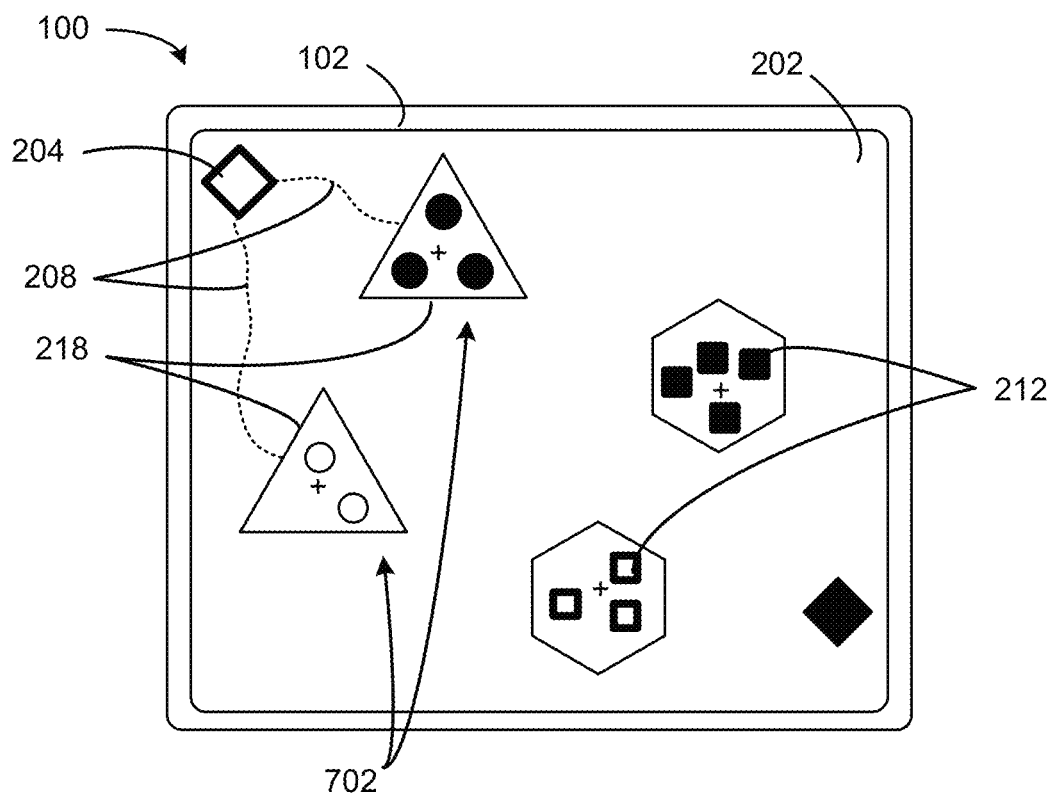
FIG. 7 is an exemplary diagram of a third routing stage.

Referring now to FIG. 7, therein is shown an exemplary diagram of a third routing stage. The first display interface 202 of the first device 102 can show the route segments 208 from the origin 204 to each of the keyword group locales 218 associated with one of the route keywords 302 of FIG. 2.

The navigation system 100 can select the first of the keyword group locales 218 as a route segment target 702 and calculate each of the route segments 208 from the origin 204 to each of the keyword group locales 218 of the route segment target 702. The route segment target 702 is the next set of the keyword group locales 218 representing one of the route keywords 302 for routing.

The navigation system 100 can select one of the keyword group locales 218 as the route segment target 702 in a variety of ways. For example, the route segment target 702 can be selected based on the order of the route keywords 302. In another example, the route segment target 702 can be selected based on the route preference 308 of FIG. 3. In yet another example, the route segment target 702 can be selected based on the proximity of one of the keyword group locales 218 to a previously routed location. The route segment target 702 can be the closest of the keyword group locales 218 to the origin 204.

For example, the keyword group locales 218 for "gas station" can be selected as the route segment target 702 based on the distance from the origin 204 to the keyword group locales 218. The closest one of the keyword group locales 218 can be selected as the route segment target 702. In another example, the route segment target 702 can be selected based on the routing preference 308 indicating that the route should include "supermarkets" after "gas stations".

The navigation system 100 can calculate the route segments 208 from the origin 204 to the keyword group locales 218 for "gas station". Since there are two of the keyword group locales 218 representing clusters of the via points 212 for "gas station", the navigation system 100 can calculate two of the route segments 208 from the origin 204 to each of the keyword group locales 218 for "gas station".

Figure 8:
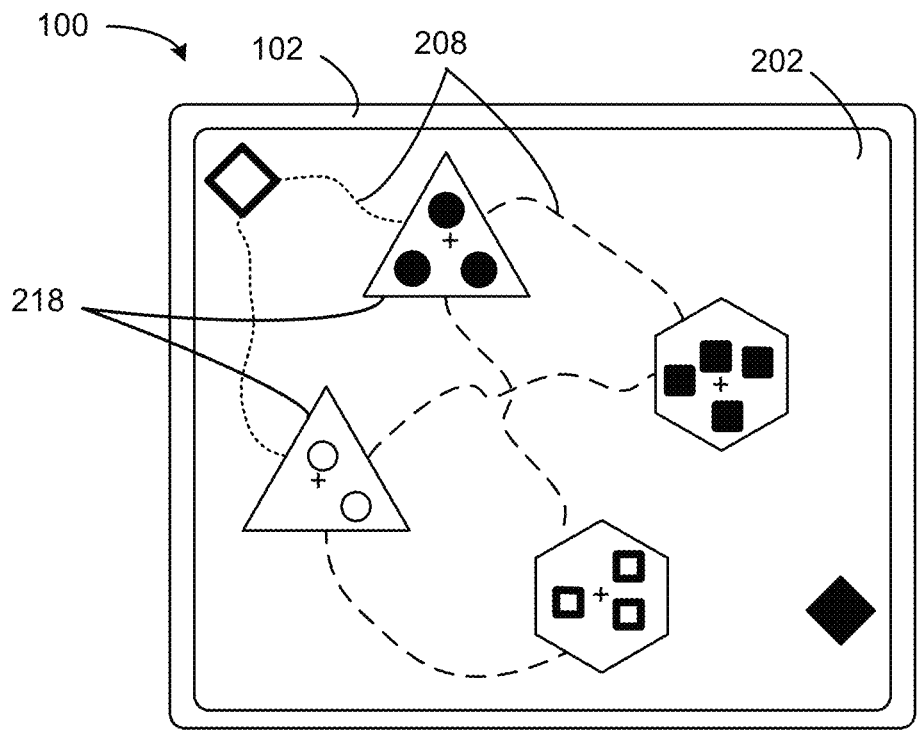
FIG. 8 is an exemplary diagram of a fourth routing stage.

Referring now to FIG. 8, therein is shown an exemplary diagram of a fourth routing stage. The first display interface 202 of the first device 102 can show the route segments 208 from each of the keyword group locales 218 for the route keywords 302 of FIG. 2 for "gas station" to each of the keyword group locales 218 for the route keywords 302 for "supermarket".

The navigation system 100 can select the next instance of the route segment target 702 of FIG. 7 and calculate the route segments 208 from each of the keyword group locales 218 of the previous routing stage to each of the keyword group locales 218 in the current instances of the route segment target 702.

For example, the first display interface 202 can show the route segments 208 from the first set of keyword group locales 218 for "gas station" to the second set of the keyword group locales 218 for "supermarket". The navigation system 100 can calculate the route segments 208 between each of the keyword group locales 218 for "gas station" and each of the keyword group locales 218 for "supermarket".

Because there are two of the keyword group locales 218 for "gas station", the navigation system 100 can calculate the route segments 208 from the first two locations to the keyword group locales 218 for "supermarket". Routing to the two locations can include an additional four of the route segments 208 to be calculated between the keyword group locales 218 for "gas station" to the keyword group locales 218 for "supermarket".

Figure 9:
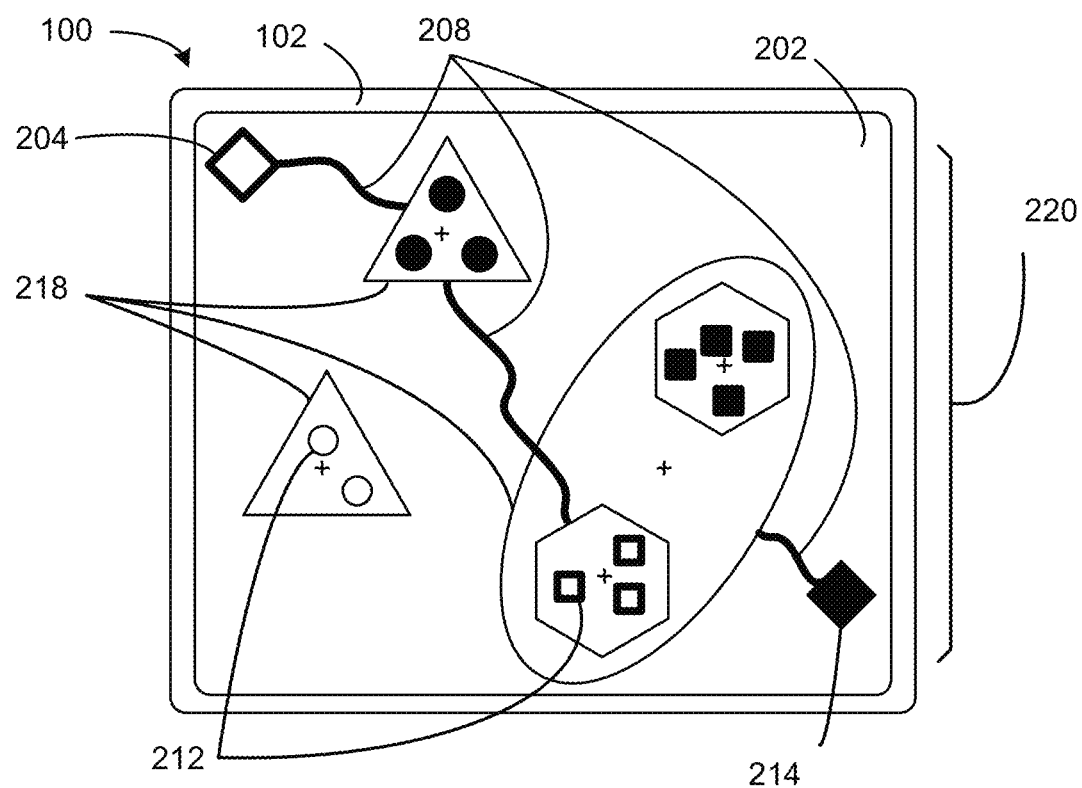
FIG. 9 is an exemplary diagram of a fifth routing stage.

Referring now to FIG. 9, therein is shown an exemplary diagram of a fifth routing stage. The first display interface 202 of the first device 102 can show the travel route 220 from the origin 204 to the destination 214 traversing the keyword group locales 218.

The navigation system 100 can calculate the route segments 208 from the keyword group locales 218 of the previous routing stage to the destination 214. Since the destination 214 is a single location, the route segments 208 can be calculated by clustering all of the via points 212 for the last of the route keywords 302 of FIG. 2 together into a single one of the keyword group locales 218 and calculating the final instance of the route segments 208 to the destination 214.

The navigation system 100 can calculate the travel route 220 by calculating the selected instances of the route segments 208 between the origin 204, the keyword group locales 218, and the destination 214. The route segments 208 can be selected by calculating a local optimum routing result based on the route segment distance 402 of FIG. 4, the route segment duration 404 of FIG. 4, the route segment difficulty 406 of FIG. 4, or a combination thereof.

For example, the travel route 220 can include the route segments 208 between the origin 204 and the keyword group locales 218 for "gas station", between the keyword group locales 218 for "gas station" and the keyword group locales 218 for "supermarket", and between the keyword group locales 218 for "supermarket" and the destination 214. The route segments 208 are selected based on the route segment distance 402 having the lowest length. The travel route 220 can be calculated to include the route segments 208 with the lowest overall route cost, the lowest route distance, the fastest route time, or a combination thereof.

Figure 10:
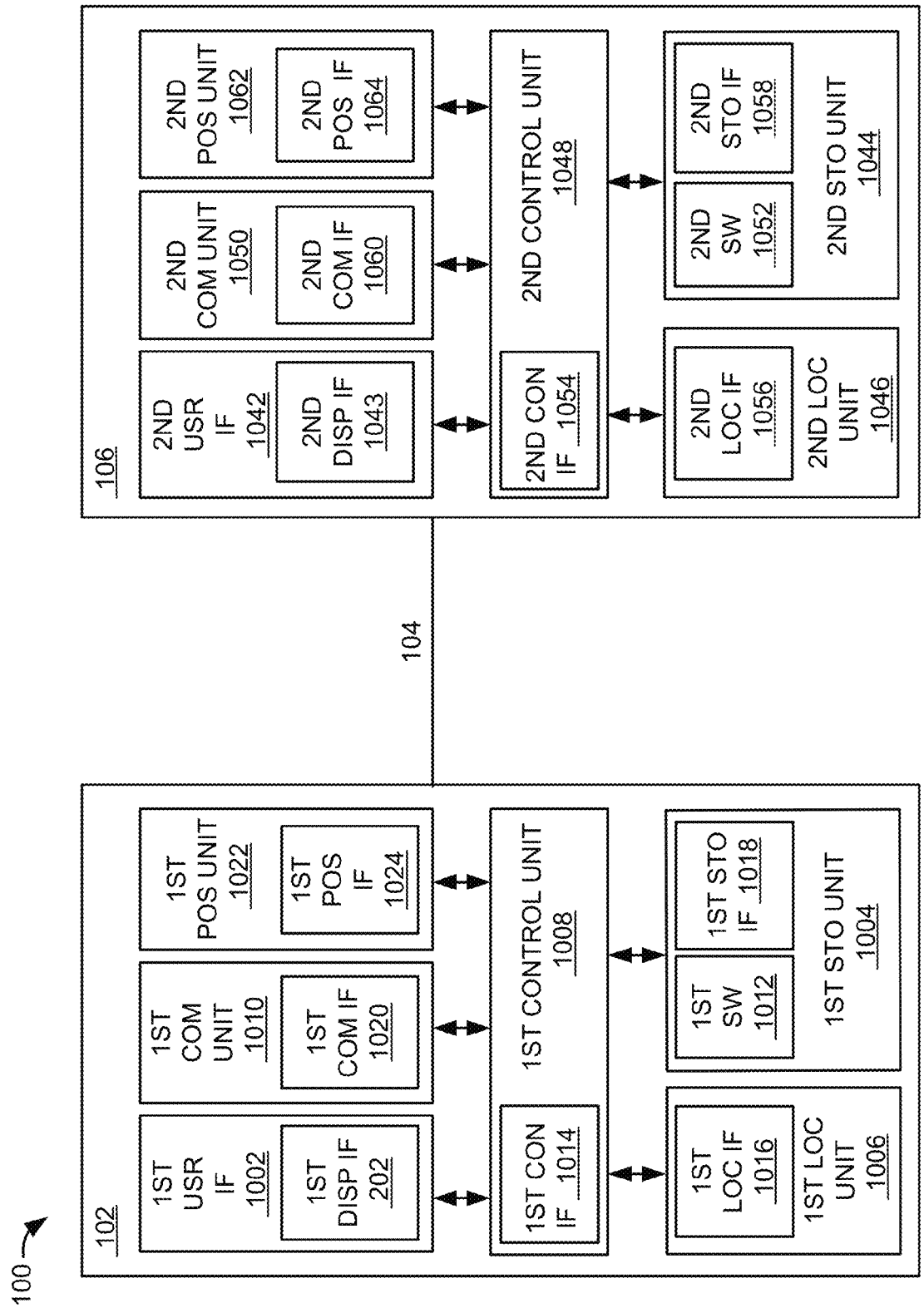
FIG. 10 is a functional block diagram of the navigation system.

Referring now to FIG. 10, therein is shown a functional block diagram of the navigation system 100. The navigation system 100 can include the first device 102, the communication path 104, and the second device 106. The first device 102 can send information over the communication path 104 to the second device 106. The second device 106 can send information over the communication path 104 to the first device 102.

The first device 102 can exchange information over the communication path 104 with the second device 106. The second device 106 can exchange information over the communication path 104 with the first device 102.

For illustrative purposes, the navigation system 100 is shown with the first device 102 as a client device, although it is understood that the navigation system 100 can have the first device 102 as a different type of device. For example, the first device can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device, such as a smart phone. The present invention is not limited to this selection for the type of devices. The selection is an example of the present invention.

The first device 102 can include a first control unit 1008. The first control unit 1008 can include a first control interface 1014. The first control unit 1008 can execute a first software 1012 to provide the intelligence of the navigation system 100.

The first control unit 1008 can be implemented in a number of different manners. For example, the first control unit 1008 can be a processor, an embedded processor, a microprocessor, a hardware control logic, a hardware finite state machine (FSM), a digital signal processor (DSP), or a combination thereof.

The first control interface 1014 can be used for communication between the first control unit 1008 and other functional units in the first device 102. The first control interface 1014 can also be used for communication that is external to the first device 102.

The first control interface 1014 can receive information from the other functional units or from external sources, or can transmit information to the other functional units or to external destinations. The external sources and the external destinations refer to sources and destinations external to the first device 102.

The first control interface 1014 can be implemented in different ways and can include different implementations depending on which functional units or external units are being interfaced with the first control interface 1014. For example, the first control interface 1014 can be implemented with electrical circuitry, microelectromechanical systems (MEMS), optical circuitry, wireless circuitry, wireline circuitry, or a combination thereof.

The first device 102 can include a first storage unit 1004. The first storage unit 1004 can store the first software 1012. The first storage unit 1004 can also store the relevant information, such as images, video, maps, profiles, sensor data, navigation information, or any combination thereof.

The first storage unit 1004 can be a volatile memory, a nonvolatile memory, an internal memory, an external memory, or a combination thereof. For example, the first storage unit 1004 can be a nonvolatile storage such as nonvolatile random access memory (NVRAM), Flash memory, disk storage, or a volatile storage such as static random access memory (SRAM).

The first storage unit 1004 can include a first storage interface 1018. The first storage interface 1018 can be used for communication between the first storage unit 1004 and other functional units in the first device 102. The first storage interface 1018 can also be used for communication that is external to the first device 102.

The first storage interface 1018 can receive information from the other functional units or from external sources, or can transmit information to the other functional units or to external destinations. The external sources and the external destinations refer to sources and destinations external to the first device 102.

The first storage interface 1018 can include different implementations depending on which functional units or external units are being interfaced with the first storage unit 1004. The first storage interface 1018 can be implemented with technologies and techniques similar to the implementation of the first control interface 1014.

The first device 102 can include a first communication unit 1010. The first communication unit 1010 can be for enabling external communication to and from the first device 102. For example, the first communication unit 1010 can permit the first device 102 to communicate with the second device 106, an attachment, such as a peripheral device or a computer desktop, and the communication path 104.

The first communication unit 1010 can also function as a communication hub allowing the first device 102 to function as part of the communication path 104 and not limited to be an end point or terminal unit to the communication path 104. The first communication unit 1010 can include active and passive components, such as microelectronics or an antenna, for interaction with the communication path 104.

The first communication unit 1010 can include a first communication interface 1020. The first communication interface 1020 can be used for communication between the first communication unit 1010 and other functional units in the first device 102. The first communication interface 1020 can receive information from the other functional units or can transmit information to the other functional units.

The first communication interface 1020 can include different implementations depending on which functional units are being interfaced with the first communication unit 1010. The first communication interface 1020 can be implemented with technologies and techniques similar to the implementation of the first control interface 1014.

The first device 102 can include a first user interface 1002. The first user interface 1002 allows a user (not shown) to interface and interact with the first device 102. The first user interface 1002 can include a first user input (not shown). The first user input can include buttons, sliders, knobs, virtual buttons, voice recognition controls, or any combination thereof.

The first user interface 1002 can include a first display interface 202. The first display interface 202 can allow the user to interact with the first user interface 1002. The first display interface 202 can include a display, a video screen, a speaker, or any combination thereof.

The first control unit 1008 can operate with the first user interface 1002 to display information generated by the navigation system 100 on the first display interface 202. The first control unit 1008 can also execute the first software 1012 for the other functions of the navigation system 100, including receiving display information from the first storage unit 1004 for display on the first display interface 202. The first control unit 1008 can further execute the first software 1012 for interaction with the communication path 104 via the first communication unit 1010.

The first device 102 can include a first location unit 1006. The first location unit 1006 can provide the location of the first device 102. The first location unit 1006 can access location information, current heading, and current speed of the first device 102, as examples.

The first location unit 1006 can be implemented in many ways. For example, the first location unit 1006 can function as at least a part of a global positioning system, an inertial navigation system, a cellular-tower location system, a pressure location system, or any combination thereof.

The first location unit 1006 can include a first location interface 1016. The first location interface 1016 can be used for communication between the first location unit 1006 and other functional units in the first device 102. The first location interface 1016 can also be used for communication that is external to the first device 102.

The first location interface 1016 can receive information from the other functional units or from external sources, or can transmit information to the other functional units or to external destinations. The external sources and the external destinations refer to sources and destinations external to the first device 102.

The first location interface 1016 can include different implementations depending on which functional units or external units are being interfaced with the first location unit 1006. The first location interface 1016 can be implemented with technologies and techniques similar to the implementation of the first control interface 1014.

The first device 102 can include a first position unit 1022. The first position unit 1022 can provide the position, motion, and orientation of the first device 102. The first position unit 1022 can access position information of the first device 102 including tilt, angle, direction, orientation, rotation, motion, acceleration, or a combination thereof.

The first position unit 1022 can be implemented in many ways. For example, the first position unit 1022 can be an accelerometer, a gyroscopic system, a MEMS system, an electrical contact system, an optical orientation system, a triangulating system, or a combination thereof.

The first position unit 1022 can include a first position interface 1024. The first position interface 1024 can be used for communication between the first position unit 1022 and other functional units in the first device 102. The first position interface 1024 can also be used for communication that is external to the first device 102.

The first position interface 1024 can receive information from the other functional units or from external sources, or can transmit information to the other functional units or to external destinations. The external sources and the external destinations refer to sources and destinations external to the first device 102.

The first position interface 1024 can include different implementations depending on which functional units or external units are being interfaced with the first position unit 1022. The first position interface 1024 can be implemented with technologies and techniques similar to the implementation of the first control interface 1014.

For illustrative purposes, the first device 102 can be partitioned having the first user interface 1002, the first storage unit 1004, the first control unit 1008, and the first communication unit 1010, although it is understood that the first device 102 can have a different partition. For example, the first software 1012 can be partitioned differently such that some or all of its function can be in the first control unit 1008 and the first communication unit 1010. Also, the first device 102 can include other functional units not shown in FIG. 10 for clarity.

The navigation system 100 can include the second device 106. The second device 106 can be optimized for implementing the present invention in a multiple device embodiment with the first device 102. The second device 106 can provide the additional or higher performance processing power compared to the first device 102.

The second device 106 can include a second control unit 1048. The second control unit 1048 can include a second control interface 1054. The second control unit 1048 can execute a second software 1052 to provide the intelligence of the navigation system 100.

The second control unit 1048 can be implemented in a number of different manners. For example, the second control unit 1048 can be a processor, an embedded processor, a microprocessor, a hardware control logic, a hardware finite state machine (FSM), a digital signal processor (DSP), or a combination thereof.

The second control interface 1054 can be used for communication between the second control unit 1048 and other functional units in the second device 106. The second control interface 1054 can also be used for communication that is external to the second device 106.

The second control interface 1054 can receive information from the other functional units or from external sources, or can transmit information to the other functional units or to external destinations. The external sources and the external destinations refer to sources and destinations external to the second device 106.

The second control interface 1054 can be implemented in different ways and can include different implementations depending on which functional units or external units are being interfaced with the second control interface 1054. For example, the second control interface 1054 can be implemented with electrical circuitry, microelectromechanical systems (MEMS), optical circuitry, wireless circuitry, wireline circuitry, or a combination thereof.

The second device 106 can include a second storage unit 1044. The second storage unit 1044 can store the second software 1052. The second storage unit 1044 can also store the relevant information, such as images, video, maps, profiles, sensor data, navigation information, or any combination thereof.

The second storage unit 1044 can be a volatile memory, a nonvolatile memory, an internal memory, an external memory, or a combination thereof. For example, the second storage unit 1044 can be a nonvolatile storage such as non-volatile random access memory (NVRAM), Flash memory, disk storage, or a volatile storage such as static random access memory (SRAM).

The second storage unit 1044 can include a second storage interface 1058. The second storage interface 1058 can be used for communication between the second storage unit 1044 and other functional units in the second device 106. The second storage interface 1058 can also be used for communication that is external to the second device 106.

The second storage interface 1058 can receive information from the other functional units or from external sources, or can transmit information to the other functional units or to external destinations. The external sources and the external destinations refer to sources and destinations external to the second device 106.

The second storage interface 1058 can include different implementations depending on which functional units or external units are being interfaced with the second storage unit 1044. The second storage interface 1058 can be implemented with technologies and techniques similar to the implementation of the second control interface 1054.

The second device 106 can include a second communication unit 1050. The second communication unit 1050 can enable external communication to and from the second device 106. For example, the second communication unit 1050 can permit the second device 106 to communicate with the first device 102, an attachment, such as a peripheral device or a computer desktop, and the communication path 104.

The second communication unit 1050 can also function as a communication hub allowing the second device 106 to function as part of the communication path 104 and not limited to be an end point or terminal unit to the communication path 104. The second communication unit 1050 can include active and passive components, such as microelectronics or an antenna, for interaction with the communication path 104.

The second communication unit 1050 can include a second communication interface 1060. The second communication interface 1060 can be used for communication between the second communication unit 1050 and other functional units in the second device 106. The second communication interface 1060 can receive information from the other functional units or can transmit information to the other functional units.

The second communication interface 1060 can include different implementations depending on which functional units are being interfaced with the second communication unit 1050. The second communication interface 1060 can be implemented with technologies and techniques similar to the implementation of the second control interface 1054.

The second device 106 can include a second user interface 1042. The second user interface 1042 allows a user (not shown) to interface and interact with the second device 106. The second user interface 1042 can include a second user input (not shown). The second user input can include buttons, sliders, knobs, virtual buttons, voice recognition controls, or any combination thereof.

The second user interface 1042 can include a second display interface 1043. The second display interface 1043 can allow the user to interact with the second user interface 1042. The second display interface 1043 can include a display, a video screen, a speaker, or any combination thereof.

The second control unit 1048 can operate with the second user interface 1042 to display information generated by the navigation system 100 on the second display interface 1043. The second control unit 1048 can also execute the second software 1052 for the other functions of the navigation system 100, including receiving display information from the second storage unit 1044 for display on the second display interface 1043. The second control unit 1048 can further execute the second software 1052 for interaction with the communication path 104 via the second communication unit 1050.

The second device 106 can include a second location unit 1046. The second location unit 1046 can provide the location of the second device 106. The second location unit 1046 can access location information, current heading, and current speed of the second device 106, as examples.

The second location unit 1046 can be implemented in many ways. For example, the second location unit 1046 can function as at least a part of a global positioning system, an inertial navigation system, a cellular-tower location system, a pressure location system, or any combination thereof.

The second location unit 1046 can include a second location interface 1056. The second location interface 1056 can be used for communication between the second location unit 1046 and other functional units in the second device 106. The second location interface 1056 can also be used for communication that is external to the second device 106.

The second location interface 1056 can receive information from the other functional units or from external sources, or can transmit information to the other functional units or to external destinations. The external sources and the external destinations refer to sources and destinations external to the second device 106.

The second location interface 1056 can include different implementations depending on which functional units or external units are being interfaced with the second location unit 1046. The second location interface 1056 can be implemented with technologies and techniques similar to the implementation of the second control interface 1054.

The second device 106 can include a second position unit 1062. The second position unit 1062 can provide the position, motion, and orientation of the second device 106. The second position unit 1062 can access position information of the second device 106 including tilt, angle, direction, orientation, rotation, motion, acceleration, or a combination thereof.

The second position unit 1062 can be implemented in many ways. For example, the second position unit 1062 can be an accelerometer, a gyroscopic system, a MEMS system, an electrical contact system, an optical orientation system, a triangulating system, or a combination thereof.

The second position unit 1062 can include a second position interface 1064. The second position interface 1064 can be used for communication between the second position unit 1062 and other functional units in the second device 106. The second position interface 1064 can also be used for communication that is external to the second device 106.

The second position interface 1064 can receive information from the other functional units or from external sources, or can transmit information to the other functional units or to external destinations. The external sources and the external destinations refer to sources and destinations external to the second device 106.

The second position interface 1064 can include different implementations depending on which functional units or external units are being interfaced with the second position unit 1062. The second position interface 1064 can be implemented with technologies and techniques similar to the implementation of the second control interface 1054.

For illustrative purposes, the second device 106 can be partitioned having the second user interface 1042, the second storage unit 1044, the second control unit 1048, and the second communication unit 1050, although it is understood that the second device 106 can have a different partition. For example, the second software 1052 can be partitioned differently such that some or all of its function can be in the second control unit 1048 and the second communication unit 1050. Also, the second device 106 can include other functional units not shown in FIG. 10 for clarity.

The functional units in the first device 102 can work individually and independently of the other functional units. For illustrative purposes, the navigation system 100 is described by operation of the first device 102. It is understood that the first device 102 can operate any of the modules and functions of the navigation system 100. For example, the first device 102 can be described to operate the first control unit 1008.

The functional units in the second device 106 can work individually and independently of the other functional units. For illustrative purposes, the navigation system 100 can be described by operation of the second device 106. It is understood that the second device 106 can operate any of the modules and functions of the navigation system 100. For example, the second device 106 is described to operate the second control unit 1048.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the first control unit 1008, although it is understood that the second device 106 can also operate the first control unit 1008.

Figure 11:
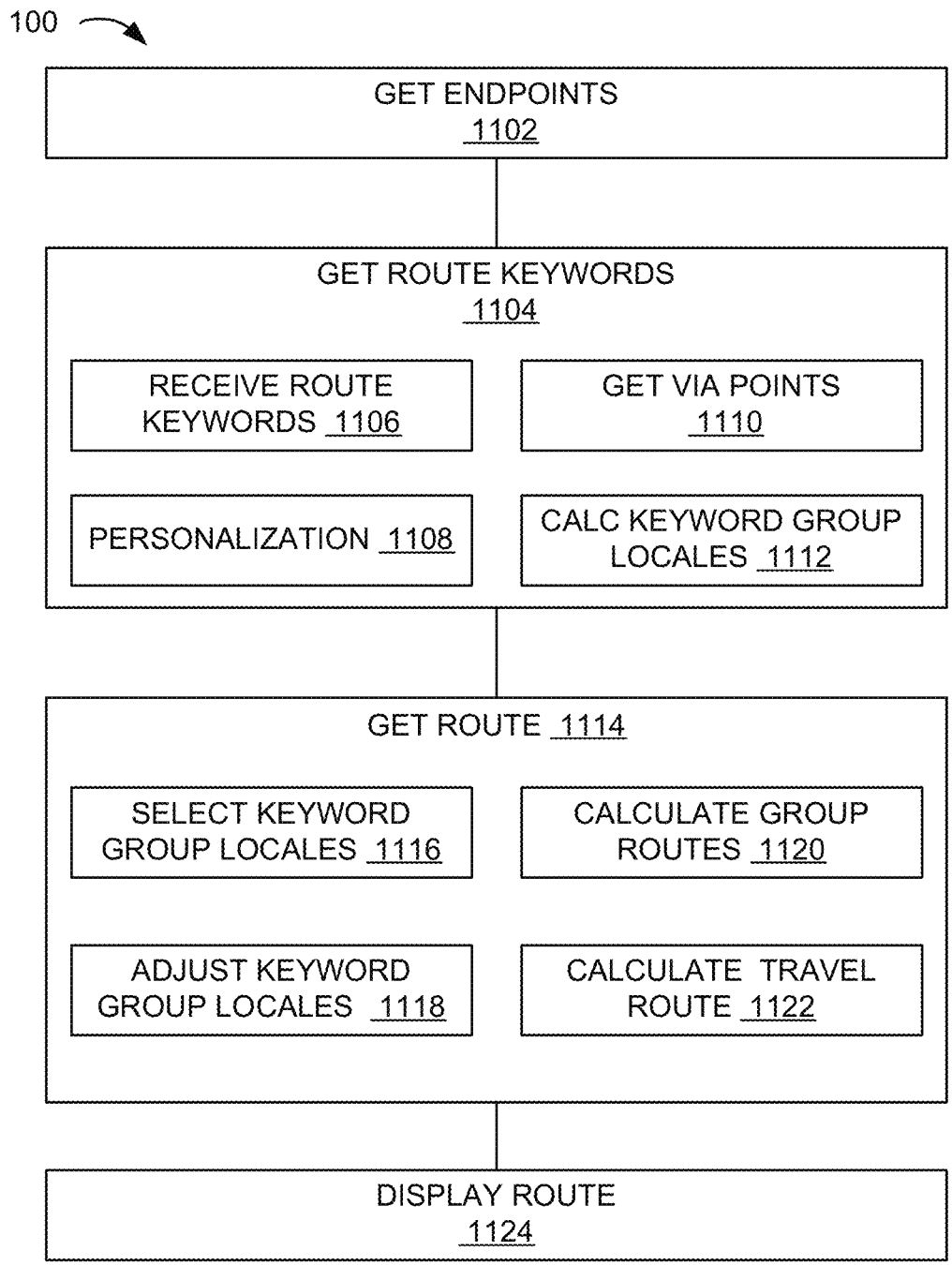
FIG. 11 is a control flow of the navigation system.

Referring now to FIG. 11, therein is shown a control flow of the navigation system 100. The navigation system 100 can receive the origin 204 of FIG. 2 and the destination 214 of FIG. 2 in a get endpoints module 1102. The navigation system 100 can receive the route keywords 302 of FIG. 3 and calculate the keyword group locales 218 of FIG. 2 in a get route keywords module 1104. The navigation system 100 can calculate the travel route 220 of FIG. 2 between the origin 204 and the destination 214 traversing the keyword group locales 218 for each of the route keywords 302 in a get route module 1114. The navigation system 100 can display the travel route 220 of FIG. 2 in a display route module 1124.

In the control flow of the navigation system 100, as an example, each module is indicated by a number and successively higher module numbers follow one another. The control flow can pass from one module to the next higher numbered module unless explicitly otherwise indicated. The modules can be implemented as hardware, as hardware acceleration functional units in the first device 102 of FIG. 1 or the second device 106 of FIG. 1 outside the first control unit 1008 of FIG. 10 or the second control unit 1048 of FIG. 10, or as hardware acceleration functional units within the first control unit 1008 or the second control unit 1048.

The navigation system 100 can include the get endpoints module 1102. The get endpoints module 1102 receives the origin 204 and the destination 214 to calculate the travel route 220 of FIG. 2. After the get endpoints module 1102 has completed, the control flow can be transferred to the get route keywords module 1104.

The origin 204 can be received in a variety of ways. For example, the origin 204 can be automatically selected from the current location 206 of FIG. 2. In another example, the origin 204 can be selected on the first device 102 of FIG. 1.

The destination 214 can be received in a variety of ways. For example, the destination 214 can be a pre-defined location, such as home or the office. In another example, the destination can be selected on the first device 102.

The navigation system 100 can include the get route keywords module 1104. The get route keywords module 1104 receives the route keywords 302 and identify the via points 212 of FIG. 2 associated with the route keywords 302. The get route keywords module 1104 can include a receive route keywords module 1106, a personalization module 1108, a get via points module 1110, and an calculate keyword group locales module 1112. After the get route keywords module 1104 has completed, the control flow can be transferred to the get route module 1114.

The get route keywords module 1104 receives the route keywords 302 in the receive route keywords module 1106. The receive route keywords module 1106 receives the route keywords 302 for calculating the keyword group locales 218 to be traversed along the travel route 220. Each of the route keywords 302 can be used to form the keyword group locales 218. After the receive route keywords module 1106 has completed, the control flow can be transferred to the personalization module 1108.

The route keywords 302 represent the category of locations to be traversed along the travel route 220. For example, the driver (not shown) can provide the route keywords 302 "supermarket" and "gas station" to find the travel route 220 from the origin 204 to the destination 214 which includes visiting a gas station and stopping at a supermarket.

The route keywords 302 can be received in a variety of ways. For example, the route keywords 302 can selected on the first device 102. In another example, the route keywords 302 can be received as voice commands using speech recognition. In yet another example, the route keywords 302 can be retrieved from memory as pre-defined values for commonly traveled routes.

The get route keywords module 1104 can include the personalization module 1108. The personalization module 1108 modifies the route keywords 302 based on the personalization profile 320 of FIG. 3. After the personalization module 1108 has completed, the control flow can be transferred to the get via points module 1110.

The personalization module 1108 can modify the route keywords 302 by modifying certain words with other words based on the personalization profile 320. The personalization profile 320 can include information to customize the route keywords 302 to reflect the personal preferences of the driver (not shown).

The personalization profile 320 includes different types of customization information and can modify the route keywords 302 in a variety of ways. The personalization module 1108 can modify the route keywords 302 by replacing or supplementing one of the route keywords 302 with matching entries from the keyword preferences 306 of FIG. 3.

For example, the route keywords 302 for "supermarket" can be replaced with the entry in the keyword preferences 306 linking "supermarket" with "Safeway™". The personalization module 1108 can calculate the travel route 220 from the origin 204 to the destination 214 including stopping at a Safeway™ supermarket instead of another type of supermarket.

In another example, the personalization module 1108 can modify the route keywords 302 by supplementing the route keywords 302 with the matching entry in the keyword preferences 306. For example, the route keywords 302 for "grocery store" can be modified by adding the terms "Wal-Mart, Target" from the matching entry of the keyword preferences 306 to the route keywords 302. The personalization module 1108 can calculate the travel route 220 from the origin 204 to the destination 214 including stopping at a supermarket or a Walmart™ or a Target™.

The keyword preferences 306 can include exclusion preferences for the route keywords 302. For example, the keyword preferences 306 can include the negative preference that the route keywords 302 for "gas station" should exclude particular types of gas stations, such as Shell™ or BP™.

The personalization profile 320 can include the routing preferences 308 of FIG. 3 that can be applied during routing to modify the selection of intermediate locations. For example, the routing preferences 308 can indicate the driver routing preference to get gas before going grocery shopping or to only shop at stores near a pre-defined location, such as home or work.

The personalization profile 320 can include the social network preferences 310 of FIG. 3 that can modify the route keywords 302 based on information from the driver's social networks including the preferences of the driver's friends. For example, the social network preferences 310 can include preferences acquired from LinkedIn™ indicating the driver has friends who "like" Starbucks™ coffee. The social network preferences 310 can be used to modify the route keywords 302 for "coffee" to include "Starbucks™ Coffee".

The personalization profile 320 can include the advertising preferences 312 of FIG. 3. For example, the personalization profile 320 can include preferences where the driver has opted in to receiving certain advertisements, such as advertisements with discount coupons. The personalization profile 320 can be used to modify the route keywords 302 for "fast food" to only include McDonalds™ locations offering a discount coupon.

The personalization profile 320 can acquire the keyword preferences 306, the routing preference 308, the social network preference 310, and the advertising preference 312 in a variety of ways. For example, the personalization profile 320 can be received as an electronic update from an external system, an automatic update from another device, or received from the first device 102.

The get route keywords module 1104 can include the get via points module 1110. The get via points module 1110 identifies the via points 212 for the route keywords 302. After the get via points module 1110 has completed, the control flow can be transferred to the calculate keyword group locales module 1112.

The get via points module 1110 can identify the via points 212 associated with each of the route keywords 302. The via points 212 for the route keywords 302 can be identified in a variety of ways. For example, the via points 212 can be identified by searching a local mapping database for entries that match each of the route keywords 302. In another example, the via points 212 can be identified by querying an external navigation database system to retrieve entries that match the route keywords 302.

The via points 212 can represent locations corresponding the one of the route keywords 302. For example, one of the via points 212 for the route keywords 302 for "gas station" can represent the Shell™ gas station on Lafayette Street in Santa Clara, Calif.

The set of the via points 212 for the route keywords 302 can be constrained to the geographical region surrounding the origin 204 and the destination 214. For example, the via points 212 can be can be constrained to locations within one half of the straight line distance between the origin 204 and the destination 214. In another example, the via points 212 can be constrained to a fixed distance value such as ten miles.

The get route keywords module 1104 can include the calculate keyword group locales module 1112. The calculate keyword group locales module 1112 calculates the keyword group locales 218 by identifying the via points 212 for the route keywords 302. After the calculate keyword group locales module 1112 has completed, the control flow can be transferred to the get route module 1114.

The keyword group locales 218 can be calculated by identifying the via points 212 associated with one of the route keywords 302 to one of the keyword group locales 218. Each of the route keywords 302 can have one or more keyword group locales 218. Each of the keyword group locales 218 can have the keyword group center 216 of FIG. 2 that indicates the location of each of the keyword group locales 218.

The calculate keyword group locales module 1112 calculates the distance between the via points 212 and the keyword group center 216 for each of the keyword group locales 218. The via points 212 within the group distance threshold 304 of FIG. 3 of the keyword group center 216 are associated with the keyword group 218.

The keyword group center 216 can be assigned in a variety of ways. The keyword group center 216 can be assigned to the location of one of the via points 212. The keyword group center 216 can be assigned to the location determined by calculating the geometric center for the via points 212 associated with one of the route keywords 302. The keyword group center 216 can be based on the distribution of the via points 212 for one of the route keywords 302.

The via points 212 associated with one of the route keywords 302 can be identified with the keyword group locales 218 in a variety of ways. The via points 212 can be calculated to be associated with one of the keyword group locales 218 based on the route keyword 302, the proximity of the via points 212, or a combination thereof.

For example, the via points 212 associated with one of the route keywords 302 can be assigned to one of the keyword group locales 218. The via points 212 associated with "gas station" can all be assigned to one of the keyword group locales 218 designated as "gas station".

In another example, the via points 212 associated with "gas station" can be split into two of the keyword group locales 218 based on location of each of the via points 212 lying within the group distance threshold 304 of the keyword group center 216. The via points 212 associated with "supermarket" can be clustered into two of the keyword group locales 218 designed "supermarket1" and "supermarket2" where the keyword group locales 218 are in locations separated in distance.

The keyword group locales 218 can be adjusted to change the size and number of the keyword group locales 218. For example, one of the keyword group locales 218 can be split into two of the keyword group locales 218, or two of the keyword group locales 218 can be combined to form a single one of the keyword group locales 218.

The via points 212 can be calculated to be assigned to one of the keyword group locales 218 based on the proximity of the via points 212 within the group distance threshold 304 to the keyword group center 216. The group distance threshold 304 can be varied to include more or fewer of the via points 212.

The via points 212 can be calculated to be assigned to one of the keyword group locales 218 based on the keyword group count 410 of FIG. 4. For example, if the keyword group count 410 is set to three, indicating that the keyword group locales 218 can have a maximum of three of the via points 212, then the number of the keyword group locales 218 can be determined by dividing the number of the via points 212 associated with the one of the route keywords 302 by three.

The navigation system 100 can include the get route module 1114. The get route module 1114 calculates the travel route 220 from the origin 204 to the destination 214 traversing the keyword group locales 218 for the route keywords 302.

The get route module 1114 can include a select keyword group locale module 1116, an adjust keyword group locales module 1118, a calculate route segments module 1120, and a calculate travel route module 1122. After the get route module 1114 has completed, the control flow can be transferred to the display route module 1124.

The get route module 1114 calculates the travel route 220 iteratively by selecting the route segment target 702 of FIG. 7, adjusting the keyword group locales 218 in the adjust keyword group locales module 1118, calculating one the route segments of FIG. 2 between two locations, and repeating until the route segments 208 of FIG. 2 for all locations have been calculated. Once the route segments 208 have been calculated, the calculate travel route module 1122 can calculate the travel route 220 based on the route segments 208 matching the optimization criterion 408 of FIG. 4.

The get route module 1114 can include the select keyword group locale module 1116. The select keyword group locale module 1116 selects the keyword group locales 218 to be used for routing. After the select keyword group locale module 1116 has completed, the control flow can be transferred to the adjust keyword group locales module 1118.

The select keyword group locale module 1116 can determine the order of routing for the keyword group locales 218 by selecting the route segment target 702 of FIG. 7 for the next routing destination along the travel route 220. The select keyword group locale module 1116 can iteratively identify the next routing destination based on the previous routing destination.

The select keyword group locale module 1116 can identify one of the keyword group locales 218 to be the next routing destination in a variety of ways. The route segment target 702 can be selected based on the order of the route keywords 302, the preference profile 306, the distance from the previous one of the keyword group locales 218, or a combination thereof.

For example, the route segment target 702 can be selected based on the order of the route keywords 302. The route segment target 702 for the next routing destination can be the next one of the route keywords 302.

In another example, the route segment target 702 can be selected based on the preference profile 306 including the routing preferences 308 indicating that a gas station should be routed to first before routing to a supermarket. In another example, the preference profile 306 can include the routing preferences 308 that a supermarket should be located near the target destination when the target destination is home.

In yet another example, the route segment target 702 can be selected based on the distances between the keyword group locales 218. The route segment target 702 can be the closest of the keyword group locales 218 from the previous routing destination.

The get route module 1114 can include the adjust keyword group locales module 1118. The adjust keyword group locales module 1118 adjusts the size and number of the keyword group locales 218 associated with each of the route keywords 302 to optimize the routing cost of the travel route 220. After the adjust keyword group locales module 1118 has completed, the control flow can be transferred to the calculate route segments module 1120.

The size and number of the keywords groups 218 can be adjusted to change the amount of time and resources required to calculate the route segments 208 between the origin 204, the keyword group locales 218, and the destination 214. The keyword group locales 218 can be adjusted to optimize the efficiency and precision of routing. Adjusting is defined as altering the size and number of the keyword group locales 218. Adjusting can include splitting one of the keyword group locales 218 into two groups or combining two of the keyword group locales 218 into one of the keyword group locales 218.

Routing efficiency is defined as routing to reduce the amount of time and resources needed to calculate the routing combinations between locations. Routing efficiency can be increased by reducing the number of routing locations in the travel route 220. For a route through two possible intermediate destinations, such as a bank with four locations and the post office with two locations, a total of 8*4=32 possible routing solutions must be calculated. Routing through an instance of the keyword group 218 for the banks and an instance of the keyword group 218 for the post offices has only one routing solution and results in the routing efficiency increasing by a factor of 32.

Routing precision is defined as routing to find a global minimum of routing cost for a travel route. Routing precision can be based on minimizing the routing time, routing distance, or a combination thereof. Routing precision can be improved by increasing the number of routing locations to determine the global minimum of routing cost.

For example, for a keyword group 218 of three banks with two banks close to one another and the third bank far away from the first two banks, the keyword group 218 can be partitioned into one instance of the keyword group with the two nearby banks and another instance of the keyword group 218 with the more distant bank. Increasing the number of the keyword group 218 allows routes through either instance of the keyword group 218 and can increase the routing precision by a factor of two over the routing precision of the single instance of the keyword group 218 routing solution.

The keyword group locales 218 can be adjusted in a variety of ways. The keyword group locales 218 can be adjusted by increasing the number of the keyword group locales 218 and reducing the number of via points 212 in each of the keyword group locales 218. The keyword group locales 218 can also be adjusted by combining two of the keyword group locales 218 and increasing the number of via points 212 in each of the keyword group locales 218.

For example, the keyword group locales 218 can be adjusted to increase the routing efficiency by reducing the number of the keyword group locales 218. Two or more of the keyword group locales 218 can be combined into one of the keyword group locales 218. The keyword group locales 218 can be adjusted to include all of the via points 212 for each of the route keywords 302 assigned to one of the keyword group locales 218. By reducing the number of the keyword group locales 218 associated with one of the route keywords 302, the total number of the keywords groups 218 is minimized, reducing the total number of routing path permutations and increasing routing efficiency.

In another example, the keyword group locales 218 can be adjusted to increase the precision of routing. The keyword group locales 218 can be adjusted to include only one of the via points 212 in each of the keyword group locales 218. By increasing the number of intermediate locations, the global minimum of routing cost can be determined, but the total number of routing path permutations is increased.

In yet another example, the keyword group locales 218 can be adjusted based on the results of the previous routing phase including the number of the route segments 208. For example, if the number of route segments 208 calculated between two of the keyword group locales 218 is greater than three, then the adjust keyword group locales module 1118 can reduced the number of keyword group locales 218 to reduce the total number of path permutations.

The get route module 1114 can include the calculate route segments module 1120. The calculate route segments module 1120 calculates the route segments 208 between the origin 204, the keyword group locales 218, and the destination 214.

The calculate route segments module 1120 can calculate the route segments 208 between two locations. The calculate route segments module 1120 can calculate the route segments from the origin 204 to one of the keyword group locales 218, between two of the keyword group locales 218, or from one of the keyword group locales 218 to the destination 214. The route segments 208 can be calculated independently of one another.

The route segments 208 can be calculated in a variety of ways. For example, the route segments 208 can be calculated by determining the path between locations with the shortest distance, the shortest time, or a combination thereof.

In another example, the route segments 208 can be calculated by determining the path with the fewest turns between the two locations. In yet another example, the route segments 208 can be calculated using a depth first search, a breadth first search, adaptive routing, heuristic routing, rule based routing, dynamic routing, or a combination thereof.

In an illustrative example, the calculate route segments module 1120 can calculate the route segments 208 from the origin 204 to each of the keyword group locales 218 associated with the route keywords 302 for "gas station". In another example, the calculate route segments module 1120 can calculate the route segments from the keyword groups associated with the route keywords for "gas station" to the keyword group locales 218 associated with the route keywords 302 for "supermarket".

In another example, once the driver has arrived at the one of the keyword group locales 218, the get route module 1114 can provide a secondary routing for navigating to one of the via points 212. Since the via points 212 are within the group distance threshold 304 of the keyword group center 216, the terminal routing to one of the via points 212 can be calculated by determining the route segments 208 from the current location 206 of FIG. 2 at one of the keyword group locales 218 to one of the via points 212.

The get route module 1114 can include the calculate travel route module 1122. The calculate travel route module 1122 calculates the travel route 220 between the origin 204 and the destination 214 based on the optimization criterion 408. After the calculate travel route module 1122 has completed, the control flow can be transferred to the display route module 1124.

The travel route 220 can be calculated by selecting a path through the route segments 208 between the origin 204, the keyword group locales 218, and the destination 214. The route segments 208 can be selected based on the optimization criterion 408.

The travel route 220 can be calculated in a variety of ways. For example, if the optimization criterion 408 is for shortest distance, then the travel route 220 can be calculated by identifying the path with the route segments 208 have the lowest total distance. The calculate travel route module 1122 can select the route segments 208 with the shortest length at each stage to form the travel route 220.

In another example, if the optimization criterion 408 is for shortest time, then the travel route 220 can be calculated by identifying the path with the route segments 208 having the lowest total travel time. The calculate travel route module 1122 can select the route segments 208 where the route segment duration 404 of FIG. 4 is shortest at each stage and combine the route segments 208 to form the travel route 220.

The navigation system 100 can include the display route module 1124. The display route module 1124 can display the travel route 220 on the first display interface 202 of FIG. 2 of the first device 102.

The display route module 1124 presents the travel route 220 and the route segments 208 overlaid on the map 210 of FIG. 2 on the first display interface 202. The display route module 1124 can provide audible instruction and navigation commands based the current location 206 of FIG. 2 of the vehicle 207 of FIG. 2 using the first location unit 1006 of FIG. 10.

The physical transformation from displaying the travel route 220 results in movement in the physical world, such as people using the first device 102, the vehicle, or a combination thereof, to navigate along the travel route 220 via the keyword group locales 218 based on the operation of the navigation system 100. As the movement in the physical world occurs, the movement itself creates additional information that is converted back to assist in routing and adjusting the keyword group locales 218 for calculating the travel route 220. This supports the continued operation of the navigation system 100 along the travel route 220 via the keyword group locales 218 and to continue the movement in the physical world.

The first software 1012 of FIG. 10 of the first device 102 can include the navigation system 100. For example, the first software 1012 can include the get endpoints module 1102, the get route keywords module 1104, the receive route keywords module 1106, the personalization module 1108, the get via points module 1110, and the calculate keyword group locales module 1112.

The first software 1012 can include the get route module 1114, the select keyword group locale module 1116, the adjust keyword group locales module 1118, the calculate route segments module 1120, and the calculate travel route module 1122. The first software 1012 can include the display route module 1124.

The first control unit 1008 of FIG. 10 can execute the first software 1012 for the get endpoints module 1102 to receive the origin 204 and the destination 214 for the travel route 220. The first control unit 1008 can execute the first software 1012 for the get route keywords module 1104 to receive the route keywords 302 and identify the keyword group locales 218.

The first control unit 1008 can execute the first software 1012 for the receive route keywords module 1106 to receive the route keywords 302. The first control unit 1008 can execute the first software 1012 for the personalization module 1108 to modify the route keywords 302.

The first control unit 1008 can execute the first software 1012 for the get via points module 1110 to identify the locations of the via points 212 associated with the route keywords 302. The first control unit 1008 can execute the first software 1012 for the calculate keyword group locales module 1112 to cluster the via points 212 into the keyword group locales 218.

The first control unit 1008 can execute the first software 1012 for the get route module 1114 to calculate the travel route 220. The first control unit 1008 can execute the first software 1012 for the select keyword group locale module 1116 to identify the next one of the keyword group locales 218 for routing. The first control unit 1008 can execute the first software 1012 for the adjust keyword group locales module 1118 to adjust the number of keyword group locales 218 and the number of the via points 212 in each of the keyword group locales 218.

The first control unit 1008 can execute the first software 1012 for the calculate route segments module 1120 to calculate the route segments 208 of the travel route 220. The first control unit 1008 can execute the first software 1012 for the calculate travel route module 1122 to calculate the travel route 220. The first control unit 1008 can execute the first software 1012 for the display route module 1124 to present the travel route 220 on the first display interface 202 of the first device 102.

The second software 1052 of FIG. 10 of the second device 106 can include the navigation system 100. For example, the second software 1052 can include the get endpoints module 1102, the get route keywords module 1104, the receive route keywords module 1106, the personalization module 1108, the get via points module 1110, and the calculate keyword group locales module 1112.

The second software 1052 can include the get route module 1114, the select keyword group locale module 1116, the adjust keyword group locales module 1118, the calculate route segments module 1120, and the calculate travel route module 1122. The second software 1052 can include the display route module 1124.

The second control unit 1048 of FIG. 10 can execute the second software 1052 for the get endpoints module 1102 to receive the origin 204 and the destination 214 for the travel route 220. The second control unit 1048 can execute the second software 1052 for the get route keywords module 1104 to receive the route keywords 302 and identify the keyword group locales 218.

The second control unit 1048 can execute the second software 1052 for the receive route keywords module 1106 to receive the route keywords 302. The second control unit 1048 can execute the second software 1052 for the personalization module 1108 to modify the route keywords 302.

The second control unit 1048 can execute the second software 1052 for the get via points module 1110 to identify the locations of the via points 212 associated with the route keywords 302. The second control unit 1048 can execute the second software 1052 for the calculate keyword group locales module 1112 to cluster the via points 212 into the keyword group locales 218.

The second control unit 1048 can execute the second software 1052 for the get route module 1114 to calculate the travel route 220. The second control unit 1048 can execute the second software 1052 for the select keyword group locale module 1116 to identify the next one of the keyword group locales 218 for routing. The second control unit 1048 can execute the second software 1052 for the adjust keyword group locales module 1118 to adjust the number of keyword group locales 218 and the number of the via points 212 in each of the keyword group locales 218.

The second control unit 1048 can execute the second software 1052 for the calculate route segments module 1120 to calculate the route segments 208 of the travel route 220. The second control unit 1048 can execute the second software 1052 for the calculate travel route module 1122 to calculate the travel route 220. The second control unit 1048 can execute the second software 1052 for the display route module 1124 to present the travel route 220 on the first display interface 202 of the first device 102.

The navigation system 100 can be partitioned between the first software 1012 and the second software 1052. For example, the second software 1052 can include the get route module 1114, the select keyword group locale module 1116, the adjust keyword group locales module 1118, the calculate route segments module 1120, and the calculate travel route module 1122. The second control unit 1048 can execute modules partitioned on the second software 1052 as previously described.

The first software 1012 can include the get endpoints module 1102, the get route keywords module 1104, the receive route keywords module 1106, the personalization module 1108, the get via points module 1110, the calculate keyword group locales module 1112, and the display route module 1124. Based on the size of the first storage unit 1004 of FIG. 10, the first software 1012 can include additional modules of the navigation system 100. The first control unit 1008 can execute the modules partitioned on the first software 1012 as previously described.

The first user interface 1002 of FIG. 10 can receive an entry by the user for the route keywords 302. The first control unit 1008 can operate the first communication unit 1010 of FIG. 10 to send the route keywords 302 to the second device 106. The first control unit 1008 can operate the first software 1012 to operate the first location unit 1006.

The second communication unit 1050 of FIG. 10 can receive the route keywords 302 from the first device 102. The second control unit 1048 can adjust the keyword group locales 218 and calculate the travel route 220. The second communication unit can send the travel route 220 to the first device 102 through the communication path 104 of FIG. 10 to be displayed on first display interface 202.

It has been discovered that the present invention provides faster routing with reduced computational power requirements by routing between the keyword group locales 218. By limiting routing to the keyword group locales 218, the total number of possible routing permutations is reduced providing fasting routing with fewer resources.

It has been discovered that the present invention balances efficiency and routing precision by routing to the keyword group locales 218 and adjusting the keyword group locales 218 by altering the number of the via points 212 in each of the keyword group locales 218. By adjusting the size of the keyword group locales 218, the navigation system 100 can identify better routes with fewer resources.

It has been discovered that the present invention provides increased functionality and provides improved route selection by identifying the via points 212 associated with one of the route keywords 302 by modifying the route keywords 302 with the keyword preference 306. By modifying the route keywords 302 with the keyword preferences 306, the navigation system 100 can find better choices when routing by keywords.

It has been discovered that the present invention provides improved routing quality by reducing the number of the via points 212 associated with the route keywords 302 by using keyword preferences 306 with exclusion preferences to indicate locations not to include with the route keywords 302. Automatically modifying the route keywords 302 with negative preferences allows the navigation system 100 more accurate locations when routing.

It has been discovered that the present invention provides increased functionality and improved routing by identifying the via points 212 associated with the route keywords 302 by modifying the route keywords 302 with the personalization profile 320 based on the social network preferences 310. Automatically modifying the route keywords 302 with social network preferences 310 can generate the via points 212 that are better suited to the user based on the preferences of their social network.

It has been discovered that the present invention provides more accurate routing by clustering the via points 212 in the keyword group locales 218 based on the route keywords 302 and proximity within the group distance threshold 304. Because the via points 212 associated with the keyword group locales 218 are within the group distance threshold 304 of the keyword group center 216, the driver can navigate to an individual one of the via points 212 nearby after navigating to the keyword group locales 218. The proximity of the via points 212 within the keyword group locales 218 allows the terminal routing to the via points 212 to be performed on a smaller geographical regions, reducing the time required to route to one of the via points 212.

The navigation system 100 describes the module functions or order as an example. The modules can be partitioned differently. For example, the receive route keywords module 1106, the personalization module 1108, and the get via points module 1110 can be combined. Each of the modules can operate individually and independently of the other modules.

Furthermore, data generated in one module can be used by another module without being directly coupled to each other. For example, the calculate route segments module 1120 can receive the keyword group locales 218 from the calculate keyword group locales module 1112.

Figure 12:
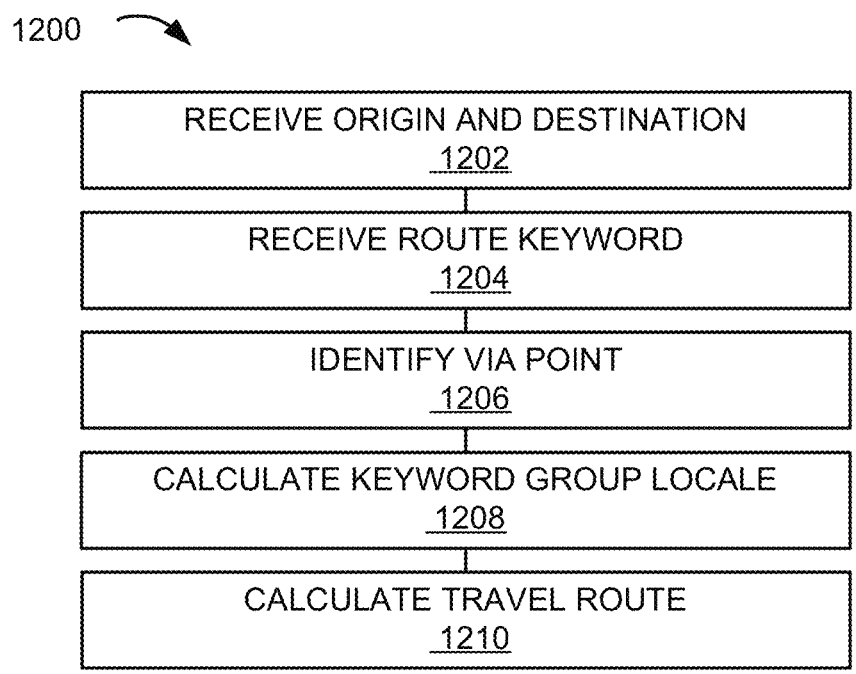
FIG. 12 is a flow chart of a method of operation of the navigation system in a further embodiment of the present invention.

Referring now to FIG. 12, therein is shown a flow chart of a method 1200 of operation of the navigation system 100 in a further embodiment of the present invention. The method 1200 includes: receiving an origin and a destination in a block 1202; receiving a route keyword for routing between the origin and the destination in a block 1204; identifying a via point matching the route keyword in a block 1206; calculating a keyword group locale based on the via point within a group distance threshold from a keyword group center in a block 1208; and calculating a travel route from the origin to the destination traversing the keyword group locale for displaying on a device in a block 1210.

The resulting method, process, apparatus, device, product, and/or system is straightforward, cost-effective, uncomplicated, highly versatile and effective, can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
   receiving an origin and a destination;
   receiving a route keyword for routing between the origin and the destination;
   identifying a via point matching the route keyword with a control unit;
   calculating a keyword group locale based on the via point within a group distance threshold from a keyword group center; and
   calculating a travel route from the origin to the destination traversing the keyword group locale for displaying on a device.

2. The method as claimed in claim 1 wherein calculating the keyword group locale includes varying the group distance threshold.

3. The method as claimed in claim 1 wherein calculating the keyword group locale includes adjusting the keyword group locale by splitting the keyword group locale to form another keyword group locale.

4. The method as claimed in claim 1 wherein calculating the keyword group locale includes assigning the keyword group center to the via point.

5. The method as claimed in claim 1 wherein calculating the keyword group locale includes assigning the keyword group center to the location halfway between the via point and another via point.

6. A method of operation of a navigation system comprising:
   receiving an origin and a destination;
   receiving a route keyword for routing between the origin and the destination;
   matching a keyword preference to the route keyword for modifying the route keyword;
   identifying a via point matching the route keyword with a control unit;
   calculating a keyword group locale based on the via point within a group distance threshold from a keyword group center; and
   calculating a travel route from the origin to the destination traversing the keyword group locale for displaying on a device.

7. The method as claimed in claim 6 wherein matching the keyword preference includes generating the keyword preference based on a social network preference.

8. The method as claimed in claim 6 wherein matching the keyword preference includes generating the keyword preference based on an advertisement preference.

9. The method as claimed in claim 6 wherein calculating the travel route includes calculating a route segment to the keyword group locale.

10. The method as claimed in claim 6 wherein calculating the travel route includes calculating the travel route based on a routing preference.

11. A navigation system comprising:
a control unit for:
receiving an origin and a destination,
receiving a route keyword for routing between the origin and the destination,
identifying a via point matching the route keyword,
calculating a keyword group locale based on the via point within a group distance threshold from a keyword group center,
calculating a travel route from the origin to the destination traversing the keyword group locale, and
a communication interface, coupled to the control unit, for sending the travel route for displaying on a device.

12. The system as claimed in claim 11 wherein the control unit is for varying the group distance threshold.

13. The system as claimed in claim 11 wherein the control unit is for adjusting the keyword group locale by splitting the keyword group locale to form another keyword group locale.

14. The system as claimed in claim 11 wherein the control unit is for assigning the keyword group center to the via point.

15. The system as claimed in claim 11 wherein the control unit is for assigning the keyword group center to the location halfway between the via point and another via point.

16. The system as claimed in claim 11 wherein the control unit is for
matching a keyword preference to the route keyword for modifying the route keyword.

17. The system as claimed in claim 16 wherein the control unit is for generating the keyword preference based on a social network preference.

18. The system as claimed in claim 16 wherein the control unit is for generating the keyword preference based on an advertisement preference.

19. The system as claimed in claim 16 wherein the control unit is for calculating a route segment to the keyword group locale.

20. The system as claimed in claim 16 wherein the control unit is for calculating the travel route based on a routing preference.

* * * * *